United States Patent
Jidhage

(10) Patent No.: US 11,968,009 B2
(45) Date of Patent: Apr. 23, 2024

(54) GENERATION OF A BEAM SET

(71) Applicant: Telefonaktiebolaget LM Ericsson (publ), Stockholm (SE)

(72) Inventor: Henrik Jidhage, Hovås (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 128 days.

(21) Appl. No.: 17/425,921

(22) PCT Filed: Jan. 29, 2019

(86) PCT No.: PCT/EP2019/052087
§ 371 (c)(1),
(2) Date: Jul. 26, 2021

(87) PCT Pub. No.: WO2020/156638
PCT Pub. Date: Aug. 6, 2020

(65) Prior Publication Data
US 2022/0302971 A1    Sep. 22, 2022

(51) Int. Cl.
*H04B 7/06* (2006.01)
*H04B 7/10* (2017.01)

(52) U.S. Cl.
CPC ............ *H04B 7/0617* (2013.01); *H04B 7/10* (2013.01)

(58) Field of Classification Search
CPC ...... H04B 7/0617; H04B 7/10; H04B 7/0602; H04B 7/0802
USPC ......................................................... 375/267
See application file for complete search history.

(56) References Cited

U.S. PATENT DOCUMENTS

| 10,014,923 | B2 | 7/2018 | Molnar et al. |
| 2004/0077379 | A1 | 4/2004 | Smith et al. |
| 2012/0319900 | A1 | 12/2012 | Johansson et al. |
| 2016/0241317 | A1 | 8/2016 | Piazzi et al. |
| 2017/0195018 | A1 | 7/2017 | Ma et al. |
| 2018/0034519 | A1* | 2/2018 | Rahman ............... H04B 7/0452 |

(Continued)

FOREIGN PATENT DOCUMENTS

| CO | 20190010145 A | 1/2018 |
| JP | 2007-501567 A | 1/2007 |
| JP | 2009-512272 A | 3/2009 |

(Continued)

OTHER PUBLICATIONS

International Search Report and Written Opinion dated Sep. 2, 2019 in International Application No. PCT/EP2019/052087 (13 pages total).

(Continued)

*Primary Examiner* — Fitwi Y Hailegiorgis
(74) *Attorney, Agent, or Firm* — Rothwell, Figg, Ernst & Manbeck, P.C.

(57) ABSTRACT

There are provided mechanisms for generating a beam set. A method is performed by a radio transceiver device. The method comprises generating the beam set as combination of at least two beam pairs. Each beam pair is formed by two respective beams with orthogonal polarizations. The two beams have their pointing directions separated by a first angular separation delta1>0. Neighbouring beam pairs have their pointing directions separated by a second angular separation delta2>0. The first angular separation delta1 is a function of the second angular separation delta2.

20 Claims, 14 Drawing Sheets

(56) References Cited

U.S. PATENT DOCUMENTS

2020/0021346 A1    1/2020  Xie et al.
2021/0352665 A1*  11/2021  Kang .................... H04L 5/0094

FOREIGN PATENT DOCUMENTS

| JP | 2018-050333 A  | 3/2018  |
| JP | 2018-514111 A  | 5/2018  |
| JP | 2020-504465 A  | 2/2020  |
| WO | 2005/032169 A2 | 4/2005  |
| WO | 2011/050866 A1 | 5/2011  |
| WO | 2016/141961 A1 | 9/2016  |
| WO | 2018/219439 A1 | 12/2018 |
| WO | 2021/214512 A1 | 10/2021 |

OTHER PUBLICATIONS

Bodhisatwa Sadhu, "A 28GHz 32-Element Phased-Array Transceiver IC with Concurrent Dual Polarized Beams and 1.4 Degree Beam-Steering Resolution for 5G Communication", Research Gate, Conference Paper, Feb. 2017, ISSCC 2017 / Session 7 / Wireless Transceivers / 7.2, DOI: 10.1109/ISSCC.2017.7870294 (4 pages).

* cited by examiner

GENERATION OF A BEAM SET

CROSS REFERENCE TO RELATED APPLICATION

This application is a 35 U.S.C. § 371 National Stage of International Patent Application No. PCT/EP2019/052087, filed Jan. 29, 2019.

TECHNICAL FIELD

Embodiments presented herein relate to a method, a radio transceiver device, a computer program, and a computer program product for generating a beam set.

BACKGROUND

In communications networks, there may be a challenge to obtain good performance and capacity for a given communications protocol, its parameters and the physical environment in which the communications network is deployed.

For example, with so-called massive multiple-input multiple-output (MIMO) systems, hundreds or more of antenna elements could be used at the radio base stations (RBS) as compared to only a few antennas as used by RBSs in current communication networks. The large number of antenna elements could be used to obtain high signal-to-interference-and-noise ratio (SINR) thanks to high a beamforming gain and high spectral efficiency through spatial multiplexing of user terminals served by the RBSs (so called MU-MIMO, where MU is short for multi-user).

Further, the antennas are used to provide network coverage within a certain angular coverage region using a certain number of beams. In general terms, the angular coverage region is the angular interval in which network coverage is provided by the antennas. In some aspects the angular coverage region thus defines a cell. One approach to massive MIMO is to use a grid-of-beams (GoB) at the RBS for transmitting signals to the user terminals within the angular coverage region. The GoB typically consists of a number of predetermined fixed beams with beamforming weights obtained from a, possibly oversampled, Discrete Fourier Transform (DFT) matrix. In order not to lose any information in the data collected by the antenna elements, the number of beams in the GoB should be at least as many as the number of antenna elements. This means that the number of beams in the GoB of a potential massive MIMO system could be several hundreds.

If the number of beams is large enough (or the angular coverage region is small enough) it can be possible to create a beam configuration using uniform beams. One such example is illustrated in FIG. 1 where 11 beams are provided to cover an angular coverage region of 120°.

However, if the system does not allow many beams, an alternative is to use wide-beams created by so-called dual polarized beamforming (DPBF). In this respect, using an analog antenna array that is dual-polarized, DPBF as disclosed in documents WO2011/050866A1 and WO2016141961 A1 can be applied to generate beams with any beam width (limited only by the physical properties of the antenna array itself). One form of DPBF involves the creation of a wide-beam from two orthogonal polarizations. One such example is shown in FIG. 2 where two rather complicated polarization patterns (denoted ffp1 and ffp2) have been optimized to create a single wide-beam (denoted DL macro beam) with similar pattern shape as a Gaussian 65° reference pattern (denoted Reference).

However, there is still a need for improved mechanisms for more flexible generation of beams that can be used to cover an angular coverage region.

SUMMARY

An object of embodiments herein is to provide efficient and flexible generation of beams that can be used to cover an angular coverage region.

According to a first aspect there is presented a method for generating a beam set. The method is performed by a radio transceiver device. The method comprises generating the beam set as combination of at least two beam pairs. Each beam pair is formed by two respective beams with orthogonal polarizations. The two beams have their pointing directions separated by a first angular separation delta1>0. Neighbouring beam pairs have their pointing directions separated by a second angular separation delta2>0. The first angular separation delta1 is a function of the second angular separation delta2.

According to a second aspect there is presented a radio transceiver device for generating a beam set. The radio transceiver device comprises processing circuitry. The processing circuitry is configured to cause the radio transceiver device to generate the beam set as combination of at least two beam pairs. Each beam pair is formed by two respective beams with orthogonal polarizations. The two beams have their pointing directions separated by a first angular separation delta1>0. Neighbouring beam pairs have their pointing directions separated by a second angular separation delta2>0. The first angular separation delta1 is a function of the second angular separation delta2.

According to a third aspect there is presented a radio transceiver device for generating a beam set. The radio transceiver device comprises a generate module configured to generate the beam set as combination of at least two beam pairs. Each beam pair is formed by two respective beams with orthogonal polarizations. The two beams have their pointing directions separated by a first angular separation delta1>0. Neighbouring beam pairs have their pointing directions separated by a second angular separation delta2>0. The first angular separation delta1 is a function of the second angular separation delta2.

Advantageously, these are efficient mechanisms for generating a beam set.

Advantageously this beam set can be used to cover an angular coverage region.

Advantageously these mechanisms make it easy to create a wide beam system for a large variety of sector sizes and number of beams.

Advantageously these mechanisms only require a beam width analysis of a dual-polarized beam composed of two uniform beams with slightly different tilts to determine the beam set.

Advantageously these mechanisms do not require usage of a complicated optimizer to change the angular coverage region. Hence, a flexible wide beam system easily adapted to support new angular coverage regions is provided.

Advantageously these mechanisms do not require offline optimization.

Advantageously these mechanisms do not require individual optimization of beams for each angular coverage area.

Advantageously these mechanisms provide a flexible wide beam system which can easily be adapted in real-time or near real-time to cover another angular coverage region.

According to a fourth aspect there is presented a computer program for generating a beam set, the computer program comprising computer program code which, when run on a radio transceiver device, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 3:
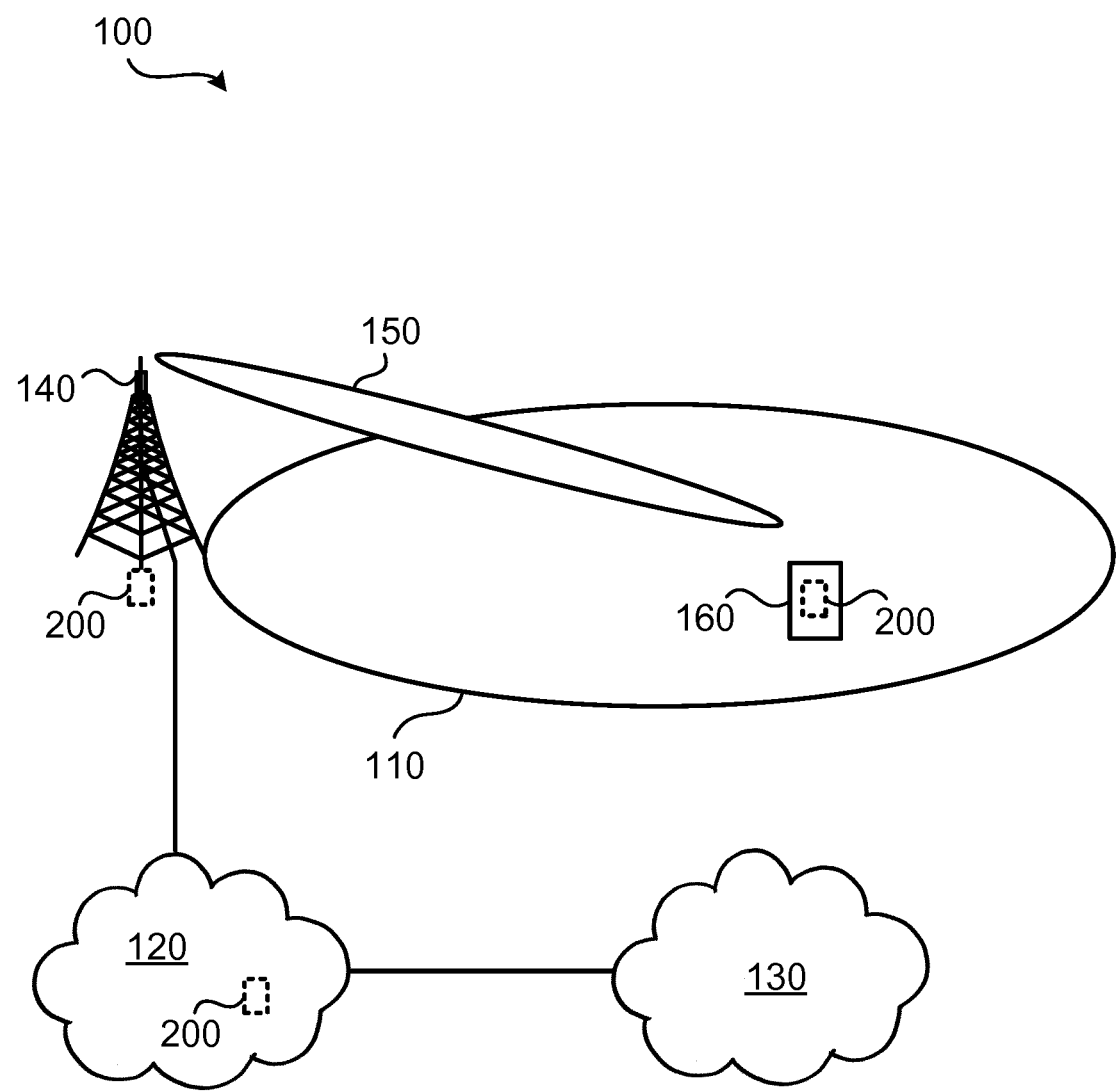
FIG. 3 is a schematic diagram illustrating a communication network according to embodiments.

FIG. 3 is a schematic diagram illustrating a communication network 100 where embodiments presented herein can be applied. The communication network 100 could be a third generation (3G) telecommunications network, a fourth generation (4G) telecommunications network, or a fifth (5G) telecommunications network and support any 3GPP telecommunications standard, where applicable.

The communication network 100 comprises a radio base station 140 configured to provide network access to at least one terminal device 160 in a radio access network 110. The radio access network 110 is operatively connected to a core network 120. The core network 120 is in turn operatively connected to a service network 130, such as the Internet. The terminal device 160 is thereby enabled to, via radio base station 140, access services of, and exchange data with, the service network 130.

Examples of radio base stations 140 are radio access network nodes, base transceiver stations, Node Bs, evolved Node Bs, g Node Bs, access points, access nodes, and backhaul nodes. Examples of terminal devices 160 are wireless devices, mobile stations, mobile phones, handsets, wireless local loop phones, user equipment (UE), smartphones, laptop computers, tablet computers, network equipped sensors, network equipped vehicles, and so-called Internet of Things devices.

As in the illustrative example of FIG. 3, the radio base station 140 communicates with the terminal device 160 using beamformed transmission and/or reception in a beam 150. The beam 150 could be part of a beam set that collectively provides network access within the radio access network 110. The boundaries of the radio access network 110 could thus be defined by the angular coverage region of the radio base station 140.

A radio transceiver device 200 is collocated with, or operatively connected to, the radio base station 140 and/or the terminal device 160. In general terms, the radio transceiver device 200 is configured to generate beams and to initiate transmission and/or reception of signals using the thus generated set of beams. Thus, although at least some of the embodiments, aspects, and examples as hereinafter for illustrative purposes will be disclosed with reference to a set of beams as generated for the radio base station 140, theses embodiments, aspects, and examples are also applicable for a set of beams as generated for the terminal device 160.

As disclosed above there is still a need for improved mechanisms for generating beams that can be used to flexible cover an angular coverage region.

Figure 4:
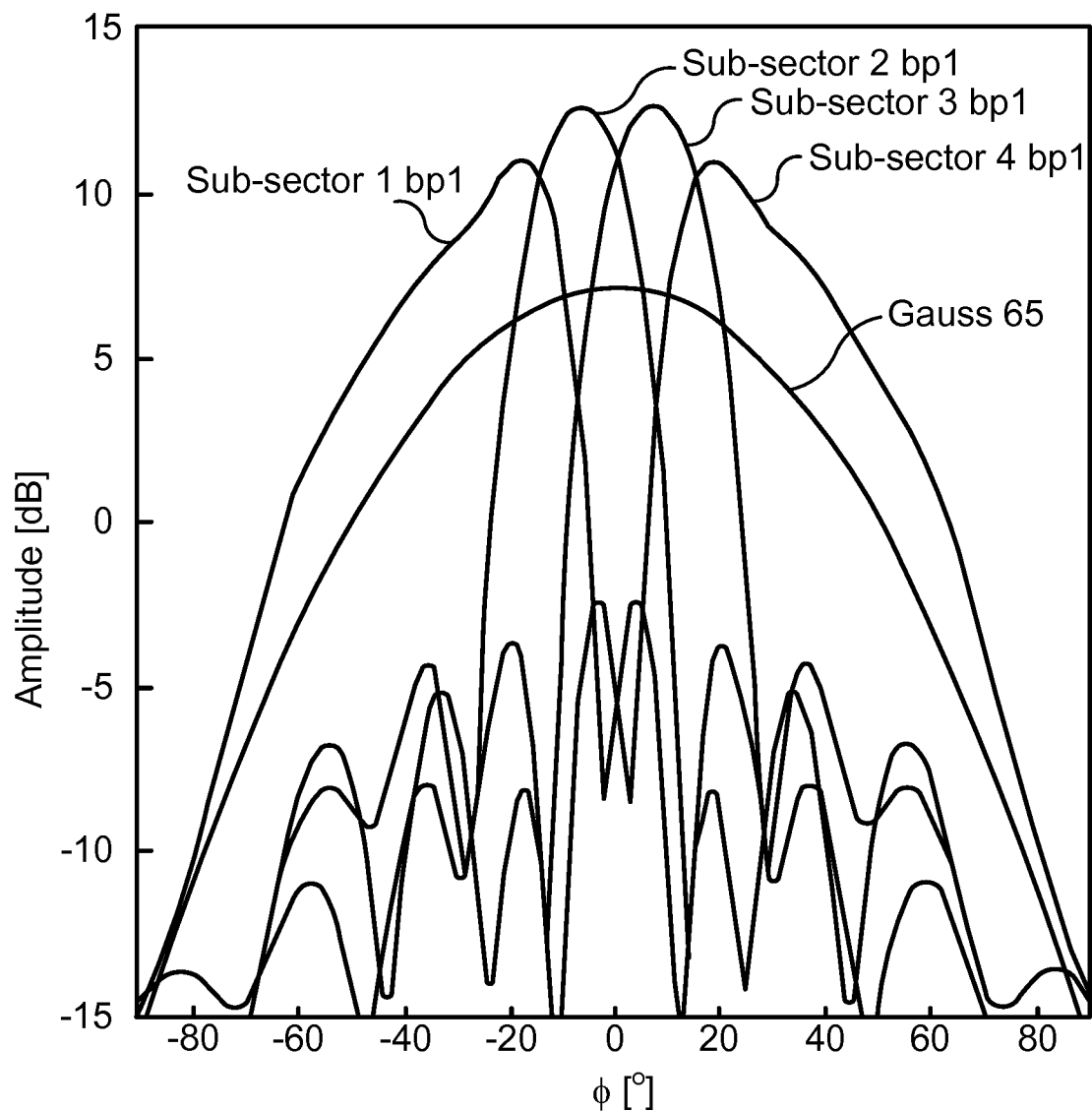
FIG. 4 schematically illustrates a set of beams according to an embodiment.

In more detail, existing mechanisms might require individual optimizations of the wide-beams or require too many uniform beams. An example of a set of beams which consists of 4 beams (denoted Sub-sector 1-4) is illustrated in FIG. 4. The beams have been optimized to cover a 120° angular coverage region with the same shape as that resulting from using a classical base station antenna (denoted Gauss 65).

The weights that generate the four different beams have been optimized using a relatively complicated optimizer based on e.g. simulated annealing with specific cost functions. One optimization results in one set of beams for one specific scenario. Table 1 shows the weights (as defined by the coefficient values; Coeff. Value) for the left-most beam in FIG. 4 for two orthogonal polarizations (Pol. 0 and Pol. 1, respectively), and where there are 8 coefficients (Coeff. Number 0 to Coeff. Number 7) per polarization.

TABLE 1

Coefficients for one beam

| Pol. | Coeff. Number | Coeff. Value |
|---|---|---|
| 0 | 0 | 0.63 |
| 0 | 1 | −0.13 + 0.58i |
| 0 | 2 | −0.21 + 0.34i |
| 0 | 3 | −0.71 − 0.16i |
| 0 | 4 | 0.37 − 0.78i |
| 0 | 5 | 0.31 + 0.59i |
| 0 | 6 | −0.56 − 0.08i |
| 0 | 7 | 0.47 − 0.54i |
| 1 | 0 | 0.63 |
| 1 | 1 | 0.13 + 0.97i |
| 1 | 2 | −0.96 + 0.29i |
| 1 | 3 | −0.42 − 0.75i |
| 1 | 4 | 0.21 − 0.35i |
| 1 | 5 | 0.27 − 0.54i |
| 1 | 6 | 0.63 − 0.05i |
| 1 | 7 | 0.20 + 0.40i |

Since one optimization results in one set of beams, if another set of beams is needed e.g. if support for a new angular coverage region is needed, a new optimization needs to be performed with new corresponding weights as a result. The above mechanisms are based on "offline" optimizations that require one set of weights per beam and scenario. This means that support is only possible for a discrete number of predetermined angular coverage region. Hence, it could be cumbersome to update a currently used set of beams in real-time or near real-time, should there be a need to cover another angular coverage region.

The embodiments disclosed herein therefore relate to mechanisms for generating a beam set 810 that can easily be adapted to give support for different angular coverage regions. In order to obtain such mechanisms there is provided a radio transceiver device 200, a method performed by the radio transceiver device 200, a computer program product comprising code, for example in the form of a computer program, that when run on a radio transceiver device 200, causes the radio transceiver device 200 to perform the method.

Figure 5:
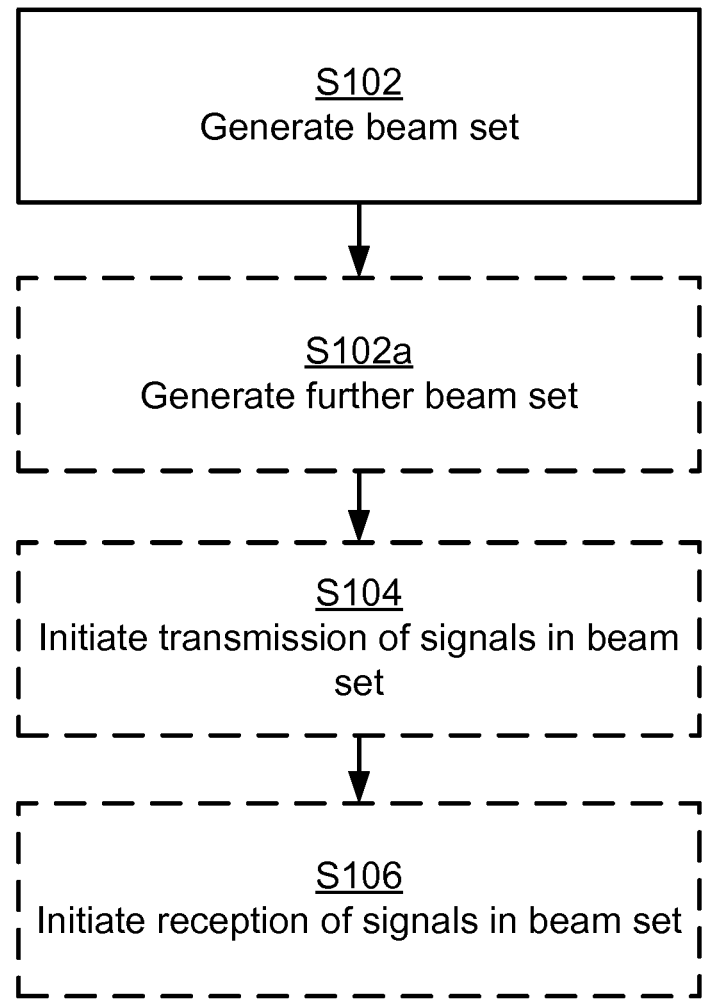
FIG. 5 is a flowchart of methods according to embodiments.

FIG. 5 is a flowchart illustrating embodiments of methods for generating a beam set 810. The methods are performed by the radio transceiver device 200. The methods are advantageously provided as computer programs 1420. Parallel reference is made to FIGS. 6 to 9, the detailed description of which will follow below.

S102: The radio transceiver device 200 generates the beam set 810 as combination of at least two beam pairs 610a, 610b, . . . , 610N.

Each beam pair 610a, 610b, . . . , 610N is formed by two respective beams 620a, 620b with orthogonal polarizations. As the skilled person understands, that the polarizations are orthogonal implies that the polarizations are orthogonal within a given tolerance, where the tolerance is given by the application of the beam set 810. Some applications might allow a higher tolerance than others, and vice versa.

The two beams 620a, 620b have their pointing directions separated by a first angular separation delta1>0 (where delta1 is denoted "δ1" in the figures). Neighbouring beam pairs 610a, 610b, . . . , 610N have their pointing directions separated by a second angular separation delta2>0 (where delta2 is denoted "δ2" in the figures).

The first angular separation delta1 is a function 910a, 910b, 920a, 920b of the second angular separation delta2.

Embodiments relating to further details of generating a beam set 810 as performed by the radio transceiver device 200 will now be disclosed.

Since each neighbouring beam pairs 610a, 610b, . . . , 610N have their pointing directions separated by a second angular separation delta2>0, this method can be used to provide coverage in a wide angular coverage region that represents a service area for the terminal device 160. In particular, according to an embodiment, the beam set 810 is generated for an angular coverage region, and wherein there are N≥2 beam pairs 610a, 610b, . . . , 610N. This is an analytical method that, using a simple form of dual-polarized beamforming, can be used for providing a beam set 810 that represents a wide-beam system and which can easily adapt to cover another angular coverage region.

There may be different ways to generate the two beams 620a, 620b in each beam pair 610a, 610b, . . . , 610N. According to an embodiment, the two beams 620a, 620b in each beam pair 610a, 610b, . . . , 610N are Discrete Fourier Transform (DFT) beams. The two beams 620a, 620b in each beam pair 610a, 610b, . . . , 610N might thus be uniform beams.

Figure 6:
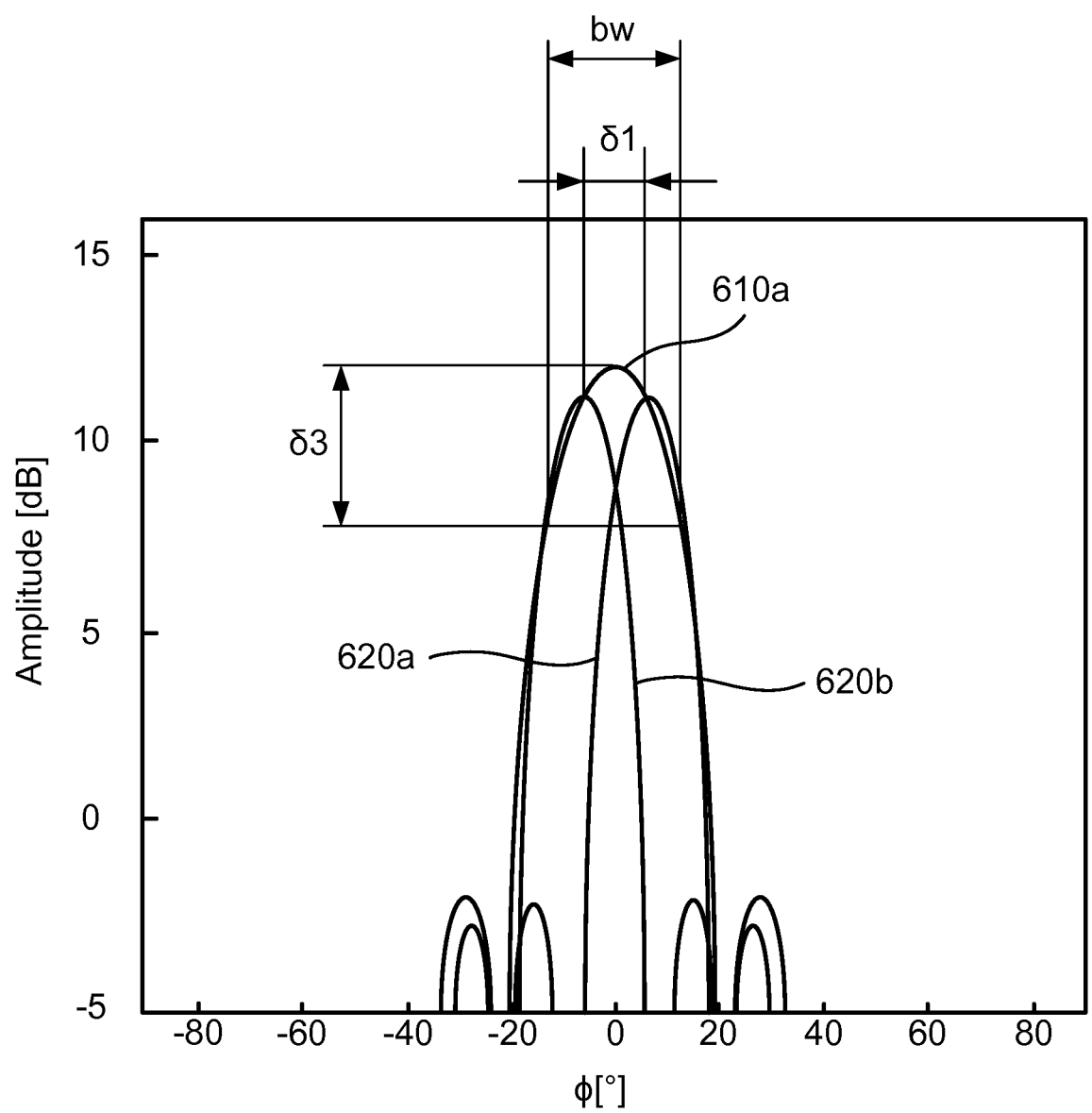
FIG. 6 schematically illustrates two beams forming a beam pair according to an embodiment.
Figure 7:
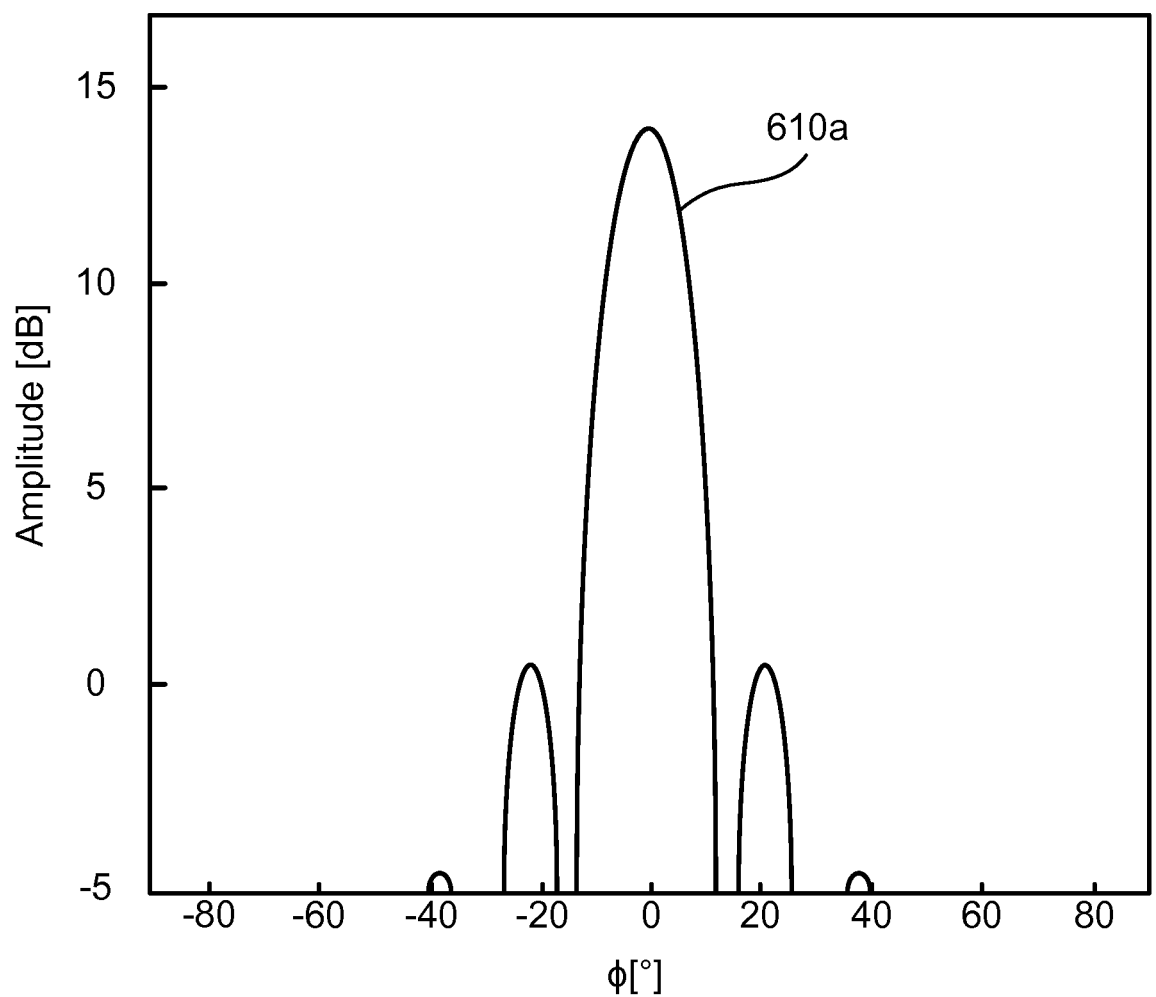
FIGS. 7 and 10 schematically illustrate a beam defined by a beam pair.

Aspects of the separation delta1 of the pointing directions of the two beams 620a, 620b will now be disclosed with special reference to FIG. 6 and FIG. 7. FIG. 6 schematically illustrates two beams 620a, 620b forming a beam pair 610a. FIG. 7 schematically illustrates one beam pair 610a.

As disclosed above, the beam pair 610a is formed by two beams 620a, 620b with orthogonal polarizations, where the two beams 620a, 620b have their pointing directions separated by a first angular separation delta1. One beam, as defined by the beam pair 610a, is thus created using two beams of two orthogonal polarizations. The two beams 620a, 620b, each of its own polarization, are tilted in different directions. The tilt separation between two beams 620a, 620b is determined by delta1. This means that it is possible to control the beam width bw of the beam pair 610a using delta1. In some aspects the first angular separation delta1 represents a relative tilt between the two beams 620a, 620b.

The resulting beam width bw might thus be expressed as a function of delta1. There is no firm upper limit for how large values of delta1 can be accepted. However, if the two beams 620a, 620b are tilted too much, a ripple will occur in the power pattern that can be larger than the straddling loss. Therefore, according to an embodiment, delta1≤delta1_max.

There could be different values of delta1_max. In some aspects, delta1_max takes a fixed value. The fixed value might be a predetermined value. In other aspects, the beam set 810 is generated at an antenna array configured for a given wavelength, and delta1_max is related to properties of the antenna array. For example, the antenna array generally comprises antenna elements provided in columns, and delta1_max is dependent on how many columns there are in the antenna array and how much the individual antenna elements are physically separated in the columns. That is, according to an embodiment the antenna array comprises antenna elements provided in M columns, where M>0 is an integer, where the antenna elements have a physical separation between neighbouring antenna elements in the columns, and where delta1_max is dependent on the value of M and the physical separation.

Figure 8:
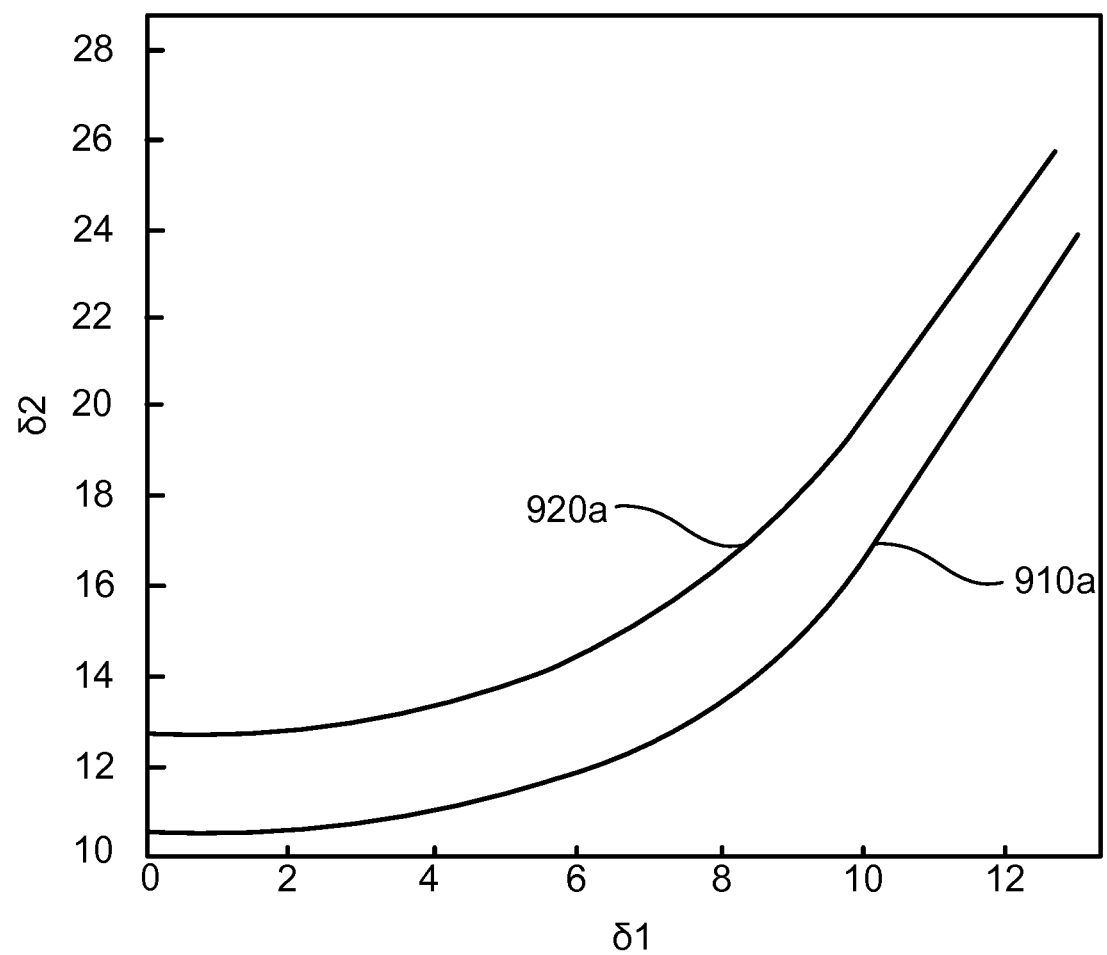
FIGS. 8 and 11 schematically illustrate functions relating a second angular separation delta2 to a first angular separation delta1 according to an embodiment.

In some aspects, each beam pair 610a, 610b, . . . , 610N has a main lobe with a beam peak. A beam width bw of each main lobe is measured at a fixed distance delta3 (where delta3 is denoted "δ3" in the figures) from its beam peak. According to an embodiment, the function 910a, 910b, 920a, 920b of the second angular separation delta2 then further depends on the fixed distance delta3. There could be different values of the fixed distance delta3. According to an embodiment, the fixed distance delta3 corresponds to a reduction of the beam peak by 1 dB to 4 dB, preferably by 2 dB to 3 dB, such as 2 dB or 3 dB. FIG. 8 illustrates the function 910a, 920a relating the second angular separation delta2 to the first angular separation delta1 for these two values of delta3.

Aspects of the separation delta2 of the pointing directions of the neighbouring beam pairs 610a, 610b, . . . , 610N will now be disclosed.

There may be different ways to determine the value of delta2, i.e., how much the pointing directions of the neighbouring beam pairs 610a, 610b, . . . , 610N are to be separated. In some aspects, the value of delta2 depends on the number N of beam pairs 610a, 610b, . . . , 610N and the width of the angular coverage region. That is, according to an embodiment, the second angular separation delta2 depends on the angular coverage region and the value of N.

In this respect, in some aspects delta2 is equal for all neighbouring beam pairs 610a, 610b, . . . , 610N. Alternatively, delta2 is not equal for all neighbouring beam pairs 610a, 610b, . . . , 610N. For example, beam pairs 610a, 610b, . . . , 610N having a high total difference in pointing direction from the center of the angular coverage region might have a higher value of delta2 than beam pairs 610a, 610b, . . . , 610N having a low total difference in pointing direction from the center of the angular coverage region. That is, neighbouring beam pairs close to edges of the angular coverage region might be separated by a higher value of delta2 than neighbouring beam pairs in the middle of the coverage region. In some aspects the value of delta2 varies up to 20% between beam pairs 610a, 610b, . . . , 610N at the edges of the angular coverage region compared to beam pairs 610a, 610b, . . . , 610N in the middle of the angular coverage region.

Based on an assumed angular coverage region and number of beam pairs N it is possible to calculate the needed beam width of one beam pair, or vice versa (i.e. to determine how wide the angular coverage region can be made using the beam pairs with a given value of delta1 and/or neighboring beam pairs that have a given separation delta2). According to an embodiment, delta2=angular coverage region/N. This expression can be used even when delta2 is not equal for all neighbouring beam pairs 610a, 610b, . . . , 610N by adding a compensation factor to delta2 for beam pairs 610a, 610b, . . . , 610N at the edges of the angular coverage region and by subtracting the same compensation factor to delta2 for beam pairs 610a, 610b, . . . , 610N in the middle of the angular coverage region.

In some aspects the second angular separation delta2 is equal to the beam width bw.

Figure 9:
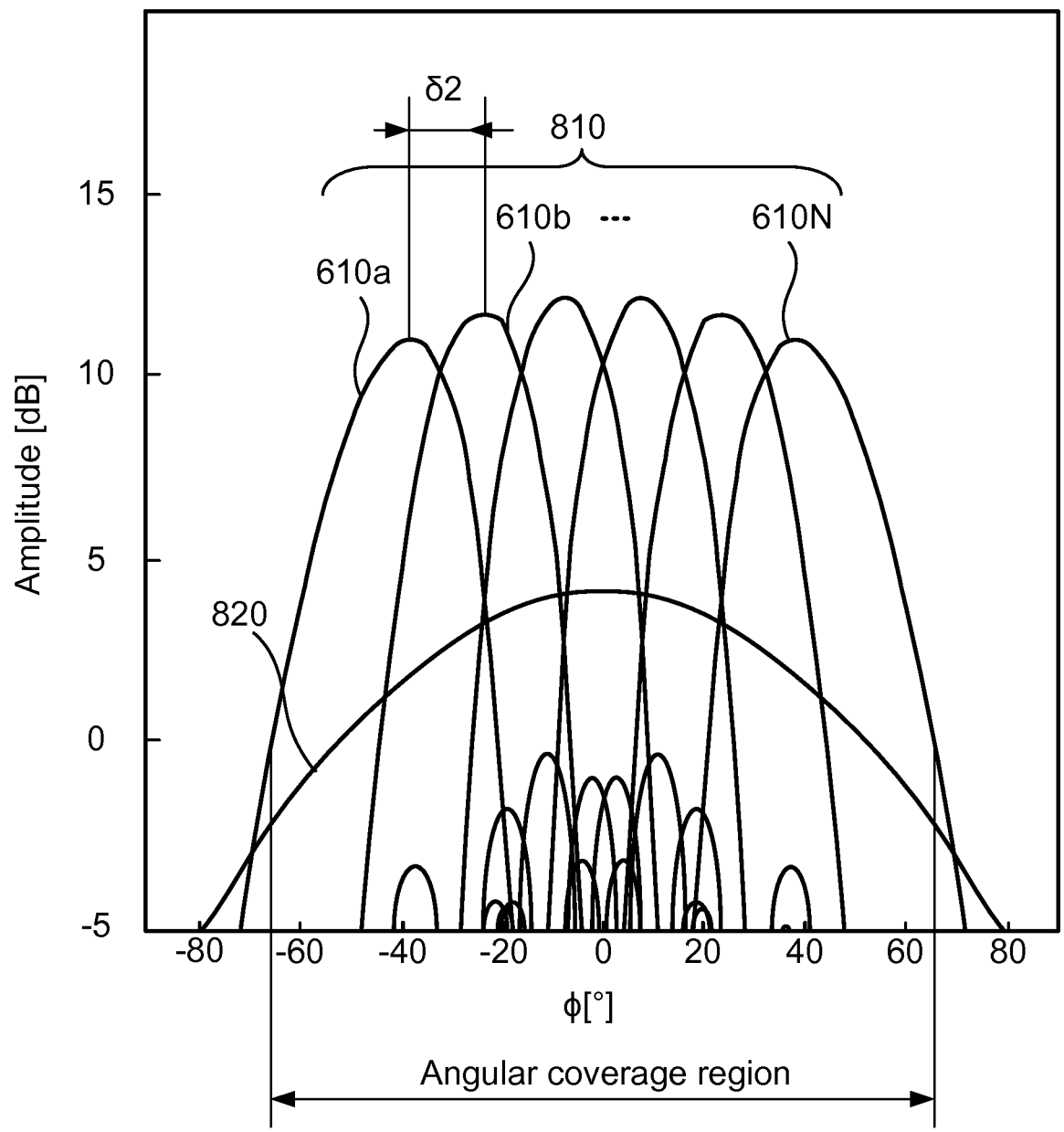
FIG. 9 schematically illustrates a set of beams according to an embodiment.

According to a non-limiting example, assume that the angular coverage region is 100°, that N=6, and that delta3=2 dB. This yields delta2=100°/6=16.7°. The resulting delta1 can then be found in FIG. 8 using function 910a, thus yielding delta1=10°. A wide beams system can now be constructed using 6 dual-polarized beam pairs 610a, 610b, . . . , 610N separated delta2=16.7° and where the two beams 620a, 620b in each beam pair 610a, 610b, . . . , 610N are separated delta1=10°. FIG. 9 schematically illustrates the resulting beam set 810, defining the wide-beam system, and further illustrates an example wide beam 820.

Once one beam set 810, defining a wide beam system of a single polarization, has been generated as described above, an additional beam set, defining a wide beam system of a single polarization being orthogonal to the beams of the beam set 810 can be generated. Hence, this additional, or second beam set, comprises second beam pairs that are orthogonal to the first beam pairs. In particular, according to an embodiment, the radio transceiver device 200 is configured to perform (optional) step S102a:

S102a: The radio transceiver device 200 generates a second beam set. The second beam set is formed by a combination of at least two second beam pairs being orthogonal to the at least two first beam pairs. Here, the beam set 810 is denoted a first beam set, and the at least two beam pairs 610a, 610b, . . . , 610N are denoted at least two first beam pairs.

In further aspects, each of the at least two first beam pairs is represented by a respective first set of beam weights for each of its orthogonal polarizations, each of the at least two second beam pairs is represented by a respective second set of beam weights for each of its orthogonal polarizations, and the second set of beam weights are based on the first set of beam weights.

Denote by exc_p1 and exc_p2 the set of beam weights for one of the two first beam pairs and denote by exc_p1_orth and exc_p2_orth the set of beam weights for one of the two second beam pairs and that the two second beam pairs are to be created from the two first beam pairs. Assume further that each set of beam weights is represented by a respective column vector of coefficients. Then the set of beam weights for one of the two second beam pairs can be found from the set of beam weights for one of the two first beam pairs as: exc_p1_orth=flipud(conj(exc_p2)), and exc_p2_orth=−flipud(conj(exc_p1)). Here, flipud(x) means that the elements of the vector x are reversed in order. Further, conj(x) means that the elements of the vector x are conjugated.

Figure 10:
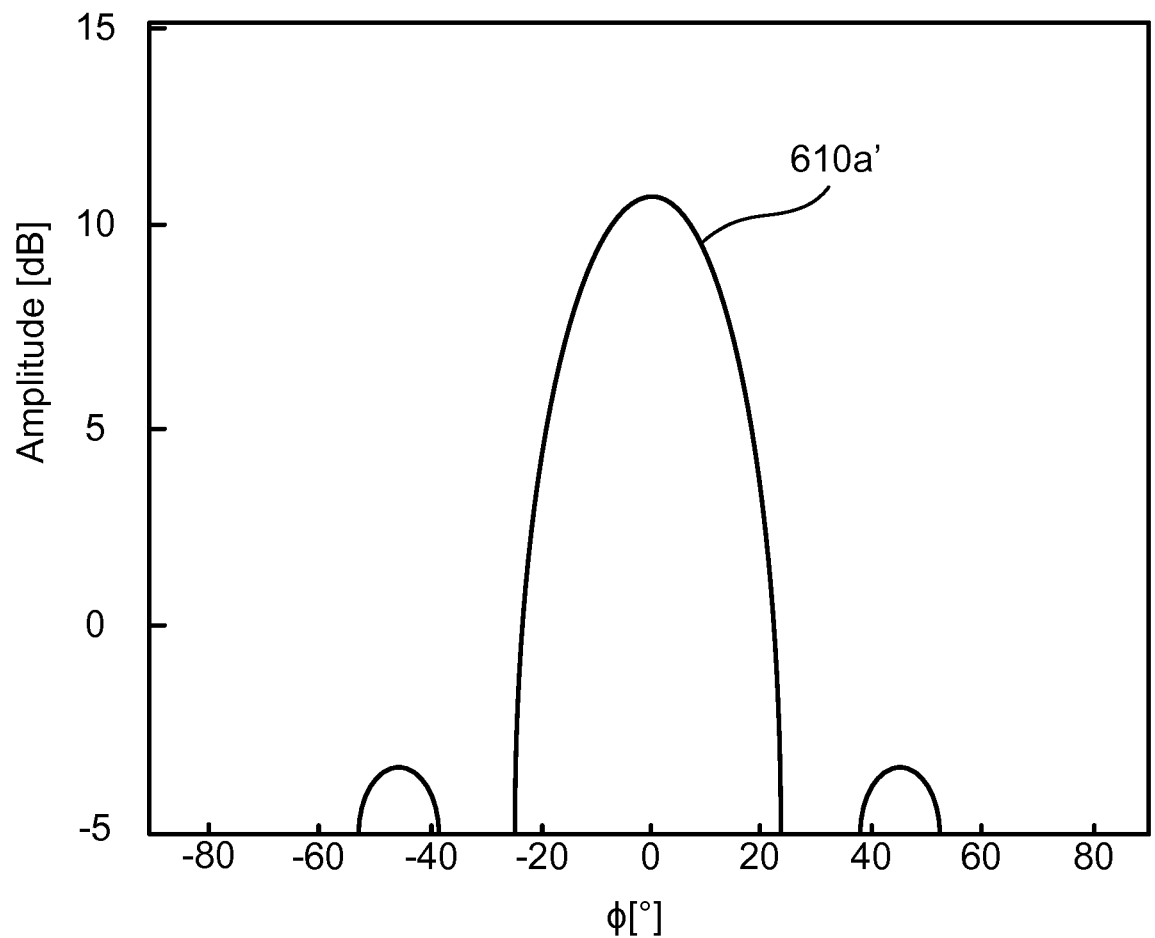
Figure 11:
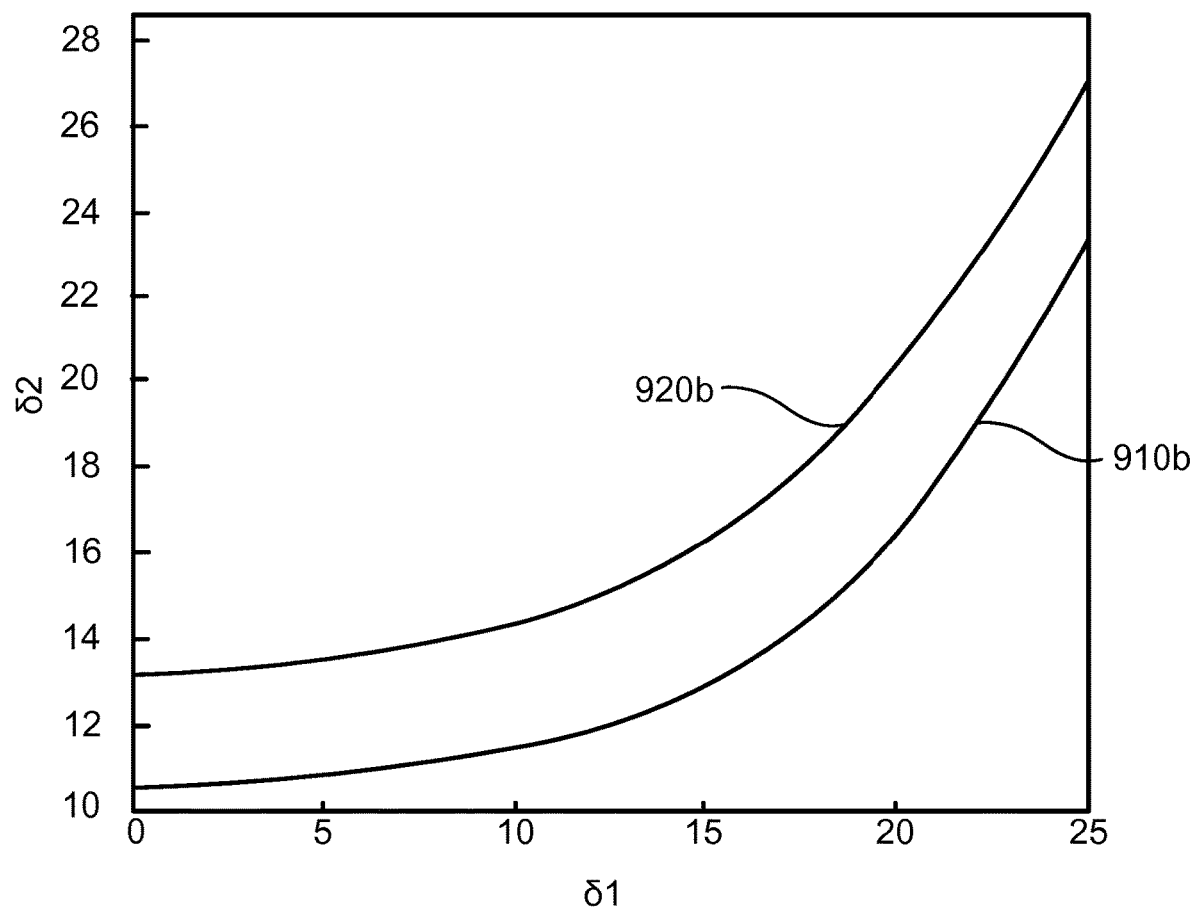

In further aspects, the above disclosed embodiments are only applied to a part of the antenna array. That is, only to some of the antenna elements of the antenna array. Hence, according to an embodiment, the beam set 810 is generated using less than all antenna elements of the antenna array. This could e.g. be the case if delta2 using the full antenna array becomes too small, which can result in the need of too many beam pairs (i.e., a high value of N) if a certain straddling loss is desired. FIG. 10 shows a wider uniform beam 610a' using an antenna array with 4 columns of antenna elements (instead of 8 columns as in FIG. 7). The resulting functions 910b, 920b for delta2 versus delta1 with delta3=2 dB and delta3=3 dB are shown in FIG. 11.

The full antenna array (i.e., all antenna elements) should be used to achieve good power utilization. This can e.g. be achieved by splitting the different beams of the wide beam system to different parts of the antenna array. For the beam set 810 of FIG. 9, this could mean that the three left-most beams of the beam set 810 are mapped on the four left-most columns of the antenna array and the three right-most beams of the beam set 810 are mapped on the four right-most columns of the antenna array. Then, one of the three left-most beams of the beam set 810 could be used simultaneously with one of the three right-most beams of the beam set 810.

Alternatively, if only one beam needs to be used at a time, then the contributions of the two polarizations can be split to different parts of the antenna array. By doing so, good power utilization can be achieved. For example, one polarization of one of the beams of the beam set 810 could be generated using the four left-most columns of the antenna array whilst the other polarization of the same beam could be generated using the four right-most columns of the antenna array.

The herein disclosed beam sets 810 can be used for signal transmission as well as signal reception.

Hence, according to an embodiment, the radio transceiver device 200 is configured to perform (optional) step S104:

S104: The radio transceiver device 200 initiates transmission of a signal in the beam set 810.

Further, according to an embodiment, the radio transceiver device 200 is configured to perform (optional) step S106:

S106: The radio transceiver device 200 initiates reception of a signal in the beam set 810.

Figure 12:
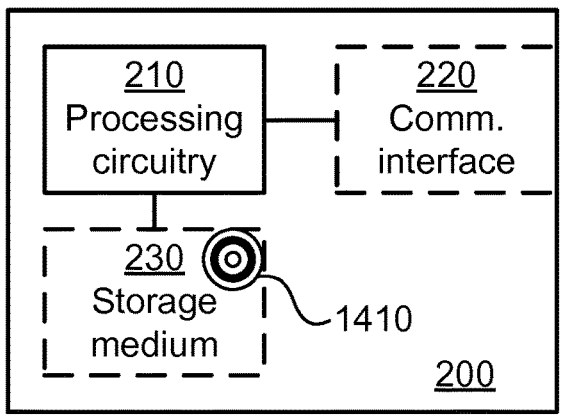
FIG. 12 is a schematic diagram showing functional units of a radio transceiver device according to an embodiment.

FIG. 12 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410 (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200 to perform a set of operations, or steps, as disclosed above. For example, the storage medium 230 may store the set of operations, and the processing circuitry 210 may be configured to retrieve the set of operations from the storage medium 230 to cause the radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200 may further comprise a communications interface 220 at least configured for communications with other components, or parts, of a terminal device 160 or a base station 160. As such the communications interface 220 may comprise one or more transmitters and receivers, comprising analogue and digital components. The processing circuitry 210 controls the general operation of the radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200 are omitted in order not to obscure the concepts presented herein.

Figure 13:
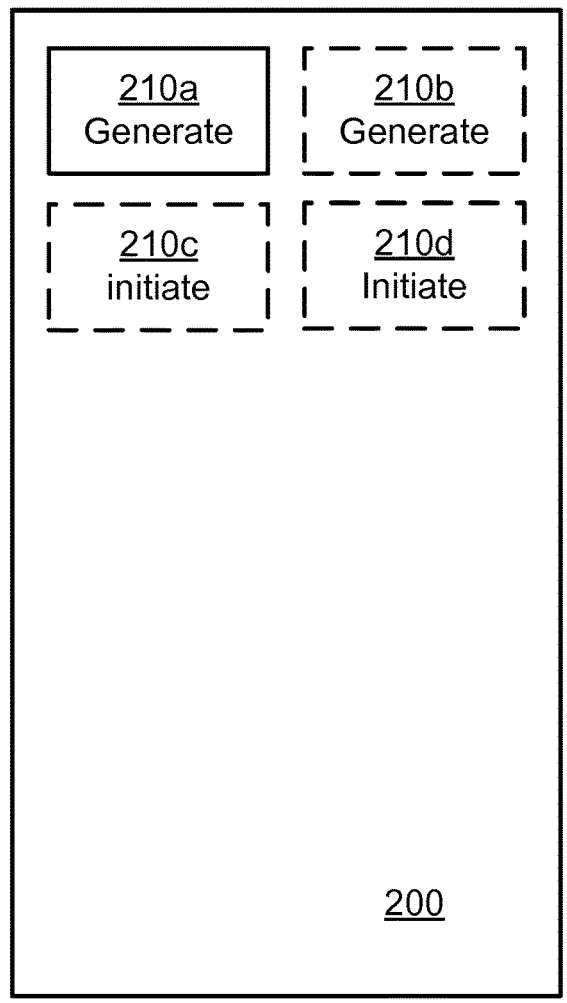
FIG. 13 is a schematic diagram showing functional modules of a radio transceiver device according to an embodiment.

FIG. 13 schematically illustrates, in terms of a number of functional modules, the components of a radio transceiver device 200 according to an embodiment. The radio transceiver device 200 of FIG. 13 comprises a generate module 210*a* configured to perform step S102. The radio transceiver device 200 of FIG. 13 may further comprise a number of optional functional modules, such as any of a generate module 210*b* configured to perform step S102*b*, an initiate module 210*c* configured to perform step S104, and/or an initiate module 210*d* configured to perform step S106. In general terms, each functional module 210*a*-210*d* may in one embodiment be implemented only in hardware and in another embodiment with the help of software, i.e., the latter embodiment having computer program instructions stored on the storage medium 230 which when run on the processing circuitry makes the radio transceiver device 200 perform the corresponding steps mentioned above in conjunction with FIG. 13. It should also be mentioned that even though the modules correspond to parts of a computer program, they do not need to be separate modules therein, but the way in which they are implemented in software is dependent on the programming language used. Preferably, one or more or all functional modules 210*a*-210*d* may be implemented by the processing circuitry 210, possibly in cooperation with the communications interface 220 and/or the storage medium 230. The processing circuitry 210 may thus be configured to from the storage medium 230 fetch instructions as provided by a functional module 210*a*-210*d* and to execute these instructions, thereby performing any steps as disclosed herein.

Figure 1:
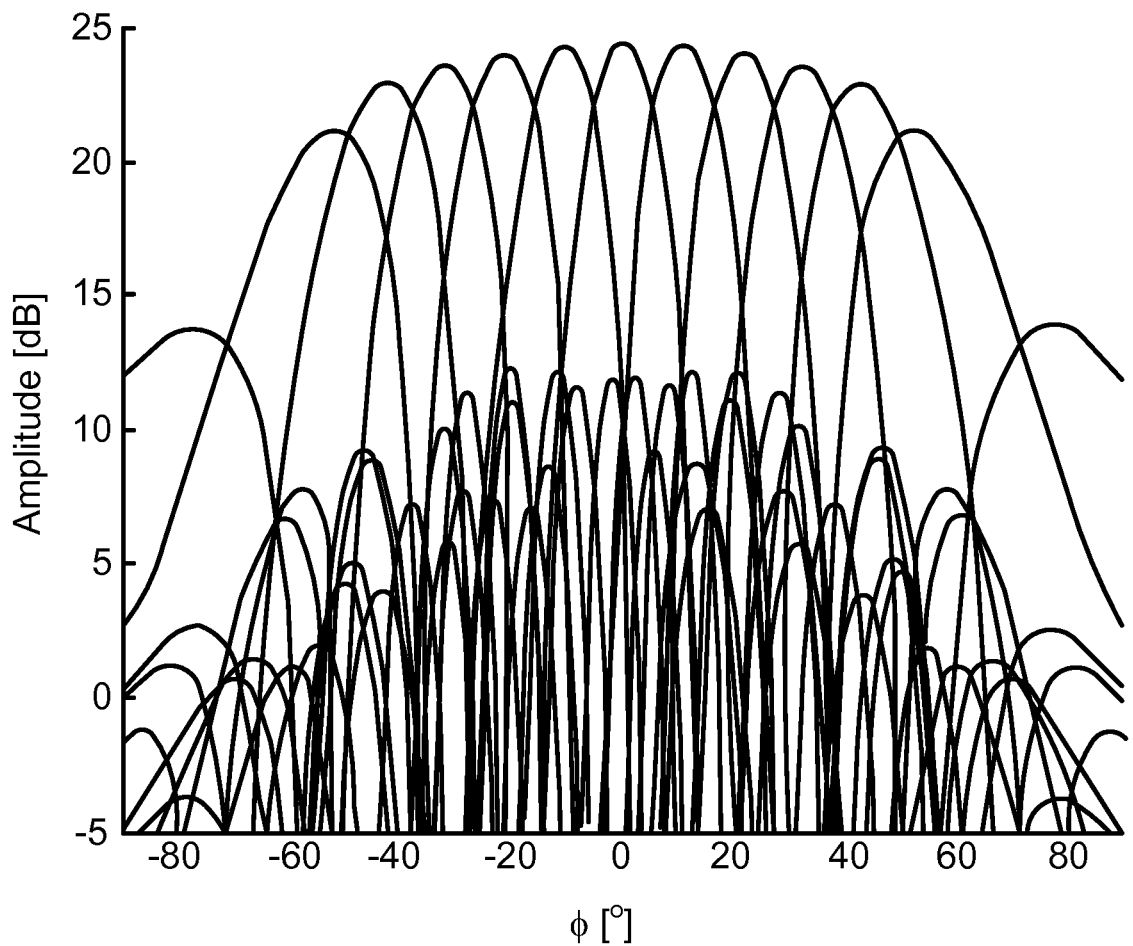
FIG. 1 schematically illustrates a uniform grid of beams.
Figure 2:
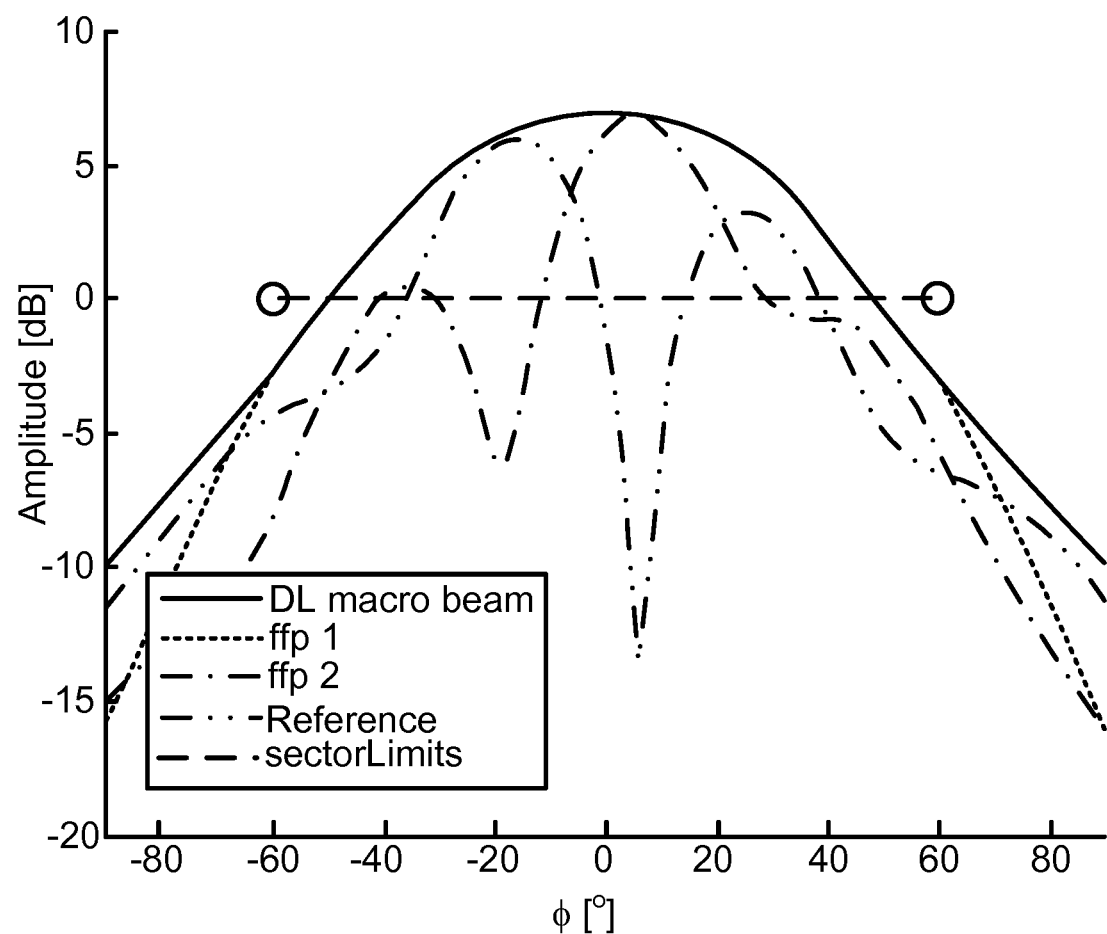
FIG. 2 schematically illustrates an example of dual-polarized beamforming.

The radio transceiver device 200 may be provided as a standalone device or as a part of at least one further device. For example, the radio transceiver device 200 may be provided as part of a base station 140 and/or as part of a terminal device 160, as in FIG. 1. Hence, a base station 140 might comprise a radio transceiver device 200 as herein disclosed, and/or a terminal device 160 might comprise a radio transceiver device 200 as herein disclosed.

Further, a first portion of the instructions performed by the radio transceiver device 200 may be executed in a first device, and a second portion of the of the instructions performed by the radio transceiver device 200 may be executed in a second device; the herein disclosed embodiments are not limited to any particular number of devices on which the instructions performed by the radio transceiver device 200 may be executed.

Figure 14:
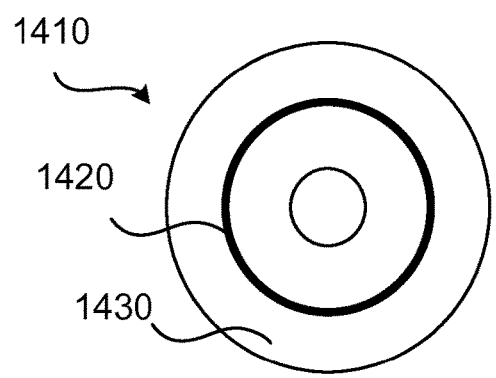
FIG. 14 shows one example of a computer program product comprising computer readable storage medium according to an embodiment.

FIG. 14 shows one example of a computer program product 1410 comprising computer readable storage medium 1430. On this computer readable storage medium 1430, a computer program 1420 can be stored, which computer program 1420 can cause the processing circuitry 210 and thereto operatively coupled entities and devices, such as the communications interface 220 and the storage medium 230, to execute methods according to embodiments described herein. The computer program 1420 and/or computer program product 1410 may thus provide means for performing any steps as herein disclosed.

In the example of FIG. 14, the computer program product 1410 is illustrated as an optical disc, such as a CD (compact disc) or a DVD (digital versatile disc) or a Blu-Ray disc. The computer program product 1410 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420 is here schematically shown as a track on the depicted optical disk, the computer program 1420 can be stored in any way which is suitable for the computer program product 1410.

Figure 15:
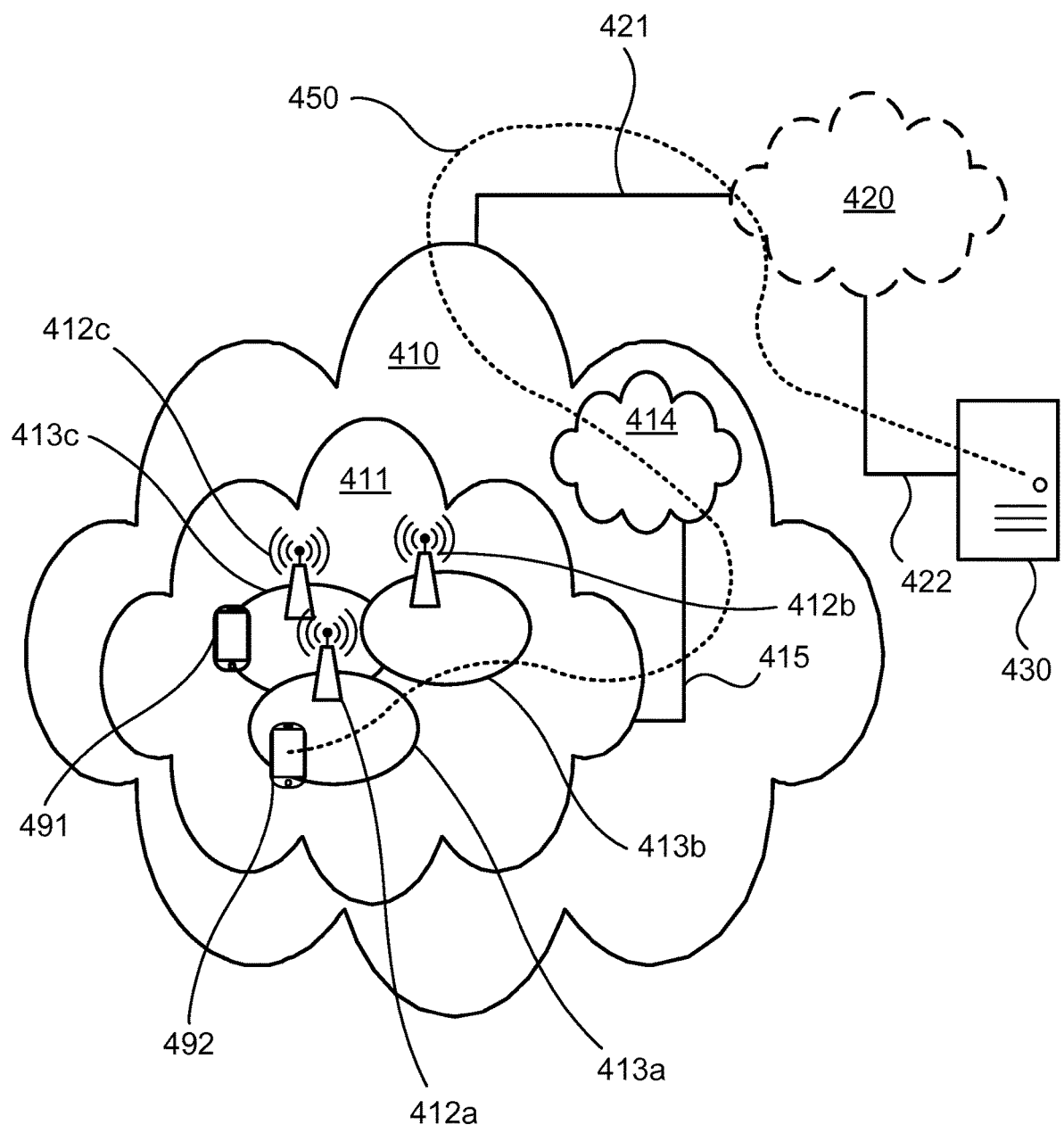
FIG. 15 is a schematic diagram illustrating a telecommunication network connected via an intermediate network to a host computer in accordance with some embodiments.

FIG. 15 is a schematic diagram illustrating a telecommunication network connected via an intermediate network to a host computer in accordance with some embodiments. In accordance with an embodiment, a communication system includes telecommunication network 410, such as a 3GPP-type cellular network, which comprises access network 411, such as radio base station 140 in FIG. 1, and core network 414, such as core network 120 in FIG. 1. Access network 411 comprises a plurality of network nodes 412a, 412b, 412c, such as NBs, eNBs, gNBs (each corresponding to the radio base station 140 of FIG. 1) or other types of wireless access points, each defining a corresponding coverage area, or cell, 413a, 413b, 413c. Each network node 412a, 412b, 412c is connectable to core network 414 over a wired or wireless connection 415. A first terminal device 491 located in coverage area 413c is configured to wirelessly connect to, or be paged by, the corresponding network node 412c. A second terminal device 492 in coverage area 413a is wirelessly connectable to the corresponding network node 412a. While a plurality of terminal devices 491, 492 are illustrated in this example, the disclosed embodiments are equally applicable to a situation where a sole terminal device is in the coverage area or where a sole terminal device is connecting to the corresponding network node 412. The terminal devices 491, 492 correspond to the terminal device 160 of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 15 as a whole enables connectivity between the connected terminal devices 491, 492 and host computer 430. The connectivity may be described as an over-the-top (OTT) connection 450. Host computer 430 and the connected terminal devices 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected terminal device 491. Similarly, network node 412 need not be aware of the future routing of an outgoing uplink communication originating from the terminal device 491 towards the host computer 430.

Figure 16:
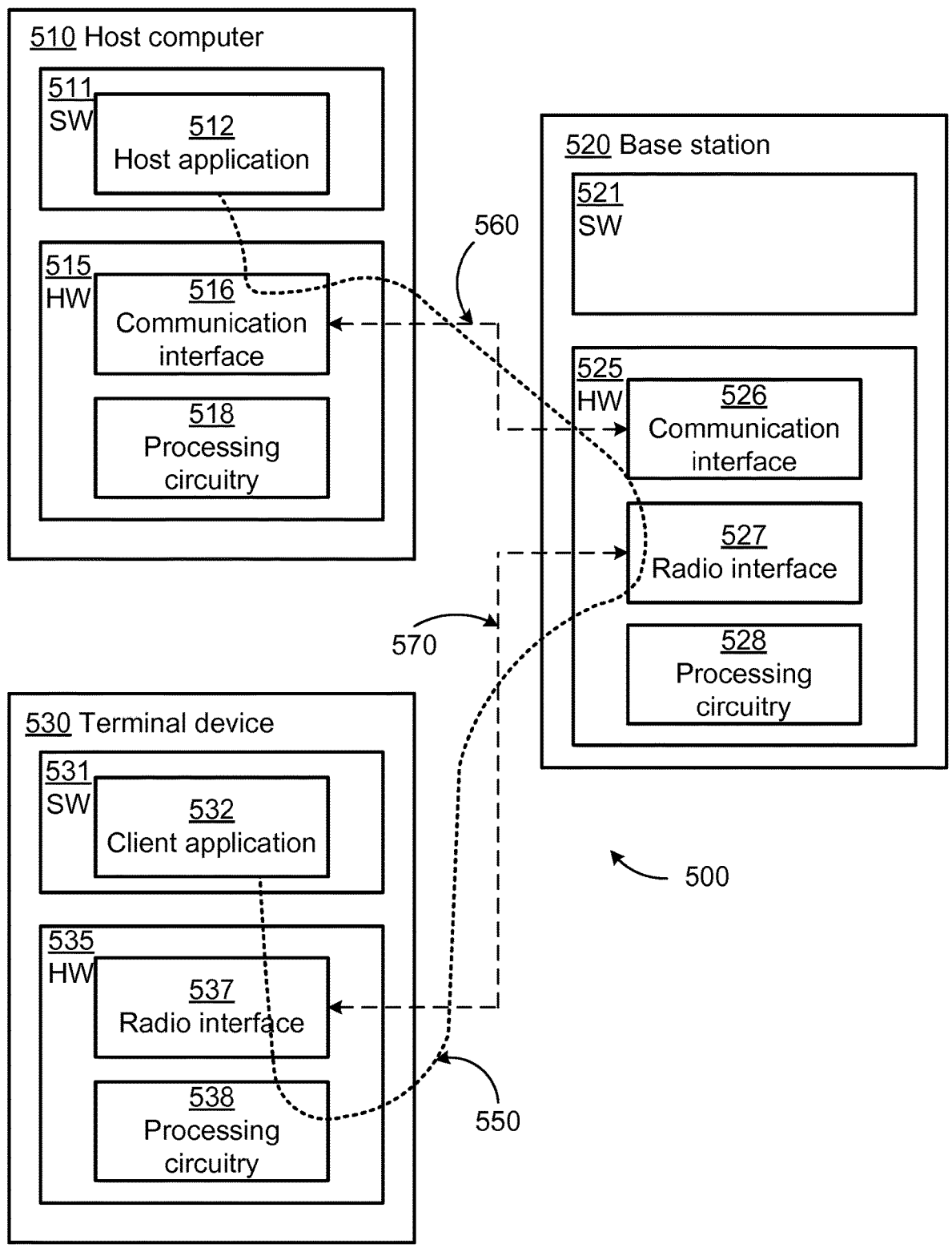
FIG. 16 is a schematic diagram illustrating host computer communicating via a radio base station with a terminal device over a partially wireless connection in accordance with some embodiments.

FIG. 16 is a schematic diagram illustrating host computer communicating via a radio base station with a terminal device over a partially wireless connection in accordance with some embodiments. Example implementations, in accordance with an embodiment, of the terminal device, radio base station and host computer discussed in the preceding paragraphs will now be described with reference to FIG. 16. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as terminal device 530 connecting via OTT connection 550 terminating at terminal device 530 and host computer 510. The terminal device 530 corresponds to the terminal device 160 of FIG. 1. In providing the service to the remote user, host application 512 may provide user data which is transmitted using OTT connection 550.

Communication system 500 further includes radio base station 520 provided in a telecommunication system and comprising hardware 525 enabling it to communicate with host computer 510 and with terminal device 530. The radio base station 520 corresponds to the radio base station 140 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with terminal device 530 located in a coverage area (not shown in FIG. 16) served by radio base station 520. Communication interface 526 may be configured to facilitate connection 560 to host computer 510. Connection 560 may be direct or it may pass through a core network (not shown in FIG. 16) of the telecommunication system and/or through one or more intermediate networks outside the telecommunication system. In the embodiment shown, hardware 525 of radio base station 520 further includes processing circuitry 528, which may comprise one or more programmable processors, application-specific integrated circuits, field programmable gate arrays or combinations of these (not shown) adapted to execute instructions. Radio base station 520 further has software 521 stored internally or accessible via an external connection.

Communication system 500 further includes terminal device 530 already referred to. Its hardware 535 may include radio interface 537 configured to set up and maintain wireless connection 570 with a radio base station serving a coverage area in which terminal device 530 is currently located. Hardware 535 of terminal device 530 further includes processing circuitry 538, which may comprise one or more programmable processors, application-specific integrated circuits, field programmable gate arrays or combinations of these (not shown) adapted to execute instructions. Terminal device 530 further comprises software 531, which is stored in or accessible by terminal device 530 and executable by processing circuitry 538. Software 531 includes client application 532. Client application 532 may be operable to provide a service to a human or non-human user via terminal device 530, with the support of host computer 510. In host computer 510, an executing host application 512 may communicate with the executing client application 532 via OTT connection 550 terminating at terminal device 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio base station 520 and terminal device 530 illustrated in FIG. 16 may be similar or identical to host computer 430, one of radio base stations 412a, 412b, 412c and one of terminal devices 491, 492 of FIG. 15, respectively. This is to say, the inner workings of these entities may be as shown in FIG. 16 and independently, the surrounding network topology may be that of FIG. 15.

In FIG. 16, OTT connection 550 has been drawn abstractly to illustrate the communication between host computer 510 and terminal device 530 via radio base station 520, without explicit reference to any intermediary devices and the precise routing of messages via these devices. Network infrastructure may determine the routing, which it may be configured to hide from terminal device 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between terminal device 530 and radio base station 520 is in accordance with the teachings of the embodiments described throughout this disclosure. One or more of the various embodiments improve the performance of OTT services provided to terminal device 530 using OTT connection 550, in which wireless connection 570 forms the last segment. More precisely, the teachings of these embodiments may reduce interference, due to improved classification ability of airborne terminal devices which can generate significant interference.

A measurement procedure may be provided for the purpose of monitoring data rate, latency and other factors on which the one or more embodiments improve. There may further be an optional network functionality for reconfiguring OTT connection 550 between host computer 510 and terminal device 530, in response to variations in the measurement results. The measurement procedure and/or the network functionality for reconfiguring OTT connection 550 may be implemented in software 511 and hardware 515 of host computer 510 or in software 531 and hardware 535 of terminal device 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect radio base station 520, and it may be unknown or imperceptible to radio base station 520. Such procedures and functionalities may be known and practiced in the art. In certain embodiments, measurements may involve proprietary terminal device signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A radio transceiver device, the radio transceiver device comprising processing circuitry, the processing circuitry being configured to cause the radio transceiver device to:
   generate a beam set comprising a first beam pair and a second beam pair neighboring the first beam pair, wherein
   the first beam pair is formed by a first beam and a second beam, wherein the first beam and second beam have orthogonal polarizations, and the first and second beams have their pointing directions separated by a first angular separation (delta1), where delta1>0,
   the second beam pair is formed by a third beam and a fourth beam, wherein the third beam and fourth beam have orthogonal polarizations, and the third and fourth beams also have their pointing directions separated by the first angular separation (delta1),
   the first beam pair has a pointing direction,
   the second beam pair has a pointing direction,
   the pointing direction of the first beam pair and the pointing direction of the second beam pair are separated by a second angular separation (delta2), where delta2>0, and
   the angle of separation (delta1) between the pointing direction of the first beam and the pointing direction of the second beam is a function of the angle of separation (delta 2) between the pointing direction of the first beam pair and the pointing direction of the second beam pair.

2. The radio transceiver device of claim 1, wherein
   the beam set is generated for an angular coverage region, and
   there are N≥2 beam pairs.

3. The radio transceiver device of claim 2, wherein the second angular separation delta2 depends on the angular coverage region and the value of N.

4. The radio transceiver device of claim 2, wherein delta2=the angular coverage region/N.

5. The radio transceiver device of claim 1, wherein
   each beam pair has a main lobe with a beam peak, wherein a beam width of each main lobe is measured at a fixed distance delta3 from its beam peak, and
   the function further depends on the fixed distance delta3.

6. The radio transceiver device of claim 5, wherein the fixed distance delta3 corresponds to a reduction of the beam peak by 1 dB to 4 dB.

7. The radio transceiver device of claim 5, wherein the second angular separation delta2 is equal to the beam width.

8. The radio transceiver device of claim 1, wherein delta1≤delta1_max.

9. The radio transceiver device of claim 8, wherein the beam set is generated at an antenna array configured for a wavelength, and wherein delta1_max is related to properties of the antenna array.

10. The radio transceiver device of claim 9, wherein:
    the antenna array comprises antenna elements provided in M columns, where M>0 is an integer,
    the antenna elements have a physical separation between neighbouring antenna elements in the columns, and
    delta1_max is dependent on the value of M and the physical separation.

11. The radio transceiver device of claim 1, wherein the two beams in each beam pair are Discrete Fourier Transform beams.

12. The radio transceiver device of claim 1, wherein the first angular separation delta1 represents a relative tilt between said two beams.

13. The radio transceiver device of claim 1, wherein
the beam set is a first beam set,
the at least two beam pairs are at least two first beam pairs, and
the processing circuitry is further configured to cause the radio transceiver device to generate a second beam set, wherein the second beam set is formed by a combination of at least two second beam pairs being orthogonal to the at least two first beam pairs.

14. The radio transceiver device of claim 13, wherein
each of the at least two first beam pairs is represented by a respective first set of beam weights for each of its orthogonal polarizations,
each of the at least two second beam pairs is represented by a respective second set of beam weights for each of its orthogonal polarizations, and
the second set of beam weights are based on the first set of beam weights.

15. The radio transceiver device of claim 1, wherein the beam set is generated using less than all antenna elements of an antenna array.

16. The radio transceiver device of claim 1, wherein the processing circuitry further is configured to cause the radio transceiver device to initiate at least one of:
transmission of a signal in said beam set, or
reception of a signal in said beam set.

17. A base station comprising the radio transceiver device of claim 1.

18. A terminal device comprising the radio transceiver device of claim 1.

19. A method performed by a radio transceiver device, the method comprising:
generating a beam set comprising a first beam pair and a second beam pair, wherein
the first beam pair is formed by a first beam and a second beam, wherein the first beam and second beam have orthogonal polarizations, and the first and second beams have their pointing directions separated by a first angular separation (delta1), where delta1>0,
the second beam pair is formed by a third beam and a fourth beam, wherein the third beam and fourth beam have orthogonal polarizations, and the third and fourth beams also have their pointing directions separated by the first angular separation (delta1),
the first beam pair has a pointing direction,
the second beam pair has a pointing direction,
the pointing direction of the first beam pair and the pointing direction of the second beam pair are separated by a second angular separation (delta2), where delta2>0, and
the angle of separation (delta1) between the pointing direction of the first beam and the pointing direction of the second beam is a function of the angle of separation (delta2) between the pointing direction of the first beam pair and the pointing direction of the second beam pair.

20. A non-transitory computer readable medium storing a computer program, the computer program comprising computer code which, when run on processing circuitry of a radio transceiver device, causes the radio transceiver device to:
generate a beam set comprising a first beam pair and a second beam pair, wherein
the first beam pair is formed by a first beam and a second beam, wherein the first beam and second beam have orthogonal polarizations, and the first and second beams have their pointing directions separated by a first angular separation (delta1), where delta1>0,
the second beam pair is formed by a third beam and a fourth beam, wherein the third beam and fourth beam have orthogonal polarizations, and the third and fourth beams also have their pointing directions separated by the first angular separation (delta1),
the first beam pair has a pointing direction,
the second beam pair has a pointing direction,
the pointing direction of the first beam pair and the pointing direction of the second beam pair are separated by a second angular separation (delta2), where delta2>0, and
the angle of separation (delta1) between the pointing direction of the first beam and the pointing direction of the second beam is a function of the angle of separation (delta2) between the pointing direction of the first beam pair and the pointing direction of the second beam pair.

* * * * *

UNITED STATES PATENT AND TRADEMARK OFFICE
CERTIFICATE OF CORRECTION

PATENT NO. : 11,968,009 B2
APPLICATION NO. : 17/425921
DATED : April 23, 2024
INVENTOR(S) : Henrik Jidhage It is certified that error appears in the above-identified patent and that said Letters Patent is hereby corrected as shown below:

In the Specification

In Column 7, Line 7, delete ""63"" and insert -- "δ3" --, therefor.

Signed and Sealed this
Sixteenth Day of July, 2024

Katherine Kelly Vidal
*Director of the United States Patent and Trademark Office*